United States Patent
Malpica et al.

(10) Patent No.: US 10,508,328 B2
(45) Date of Patent: Dec. 17, 2019

(54) RAPID HEATING OF SHEET METAL BLANKS FOR STAMPING

(71) Applicant: Novelis Inc., Atlanta, GA (US)

(72) Inventors: Julio Malpica, Canton, GA (US); Cedric Wu, Marietta, GA (US); Rahul Vilas Kulkarni, Marietta, GA (US); Rodger Brown, Atlanta, GA (US); Duane E. Bendzinski, Woodstock, GA (US)

(73) Assignee: NOVELIS INC., Atlanta, GA (US)

( * ) Notice: Subject to any disclaimer, the term of this patent is extended or adjusted under 35 U.S.C. 154(b) by 183 days.

(21) Appl. No.: 15/716,570

(22) Filed: Sep. 27, 2017

(65) Prior Publication Data

US 2018/0085810 A1  Mar. 29, 2018

Related U.S. Application Data

(60) Provisional application No. 62/400,426, filed on Sep. 27, 2016, provisional application No. 62/505,948, filed on May 14, 2017.

(51) Int. Cl.
*B21D 22/02* (2006.01)
*C22F 1/04* (2006.01)
(Continued)

(52) U.S. Cl.
CPC ............ *C22F 1/04* (2013.01); *B21B 39/02* (2013.01); *B21B 39/34* (2013.01); *B21C 47/16* (2013.01);
(Continued)

(58) Field of Classification Search
CPC ......... B21B 39/02; B21B 39/34; B21C 47/18; B21C 47/3433; B21D 22/022;
(Continued)

(56) References Cited

U.S. PATENT DOCUMENTS

| | | | |
|---|---|---|---|
| 1,872,045 A | 8/1932 | Smitmans | |
| 2,001,637 A | 5/1935 | Talbot | |

(Continued)

FOREIGN PATENT DOCUMENTS

| | | |
|---|---|---|
| CN | 201596682 | 10/2010 |
| DE | 857787 C | 12/1952 |

(Continued)

OTHER PUBLICATIONS

International Patent Application No. PCT/US2017/053665, International Search Report and Written Opinion dated Dec. 20, 2017, 15 pages.

(Continued)

*Primary Examiner* — David B Jones
(74) *Attorney, Agent, or Firm* — Kilpatrick Townsend & Stockton LLP

(57) ABSTRACT

Systems and methods of hot forming a metal blank include receiving the metal blank at a heater and positioning the blank adjacent a magnetic rotor of the heater. The systems and methods also include heating the metal blank through the magnetic rotor by rotating the magnetic rotor. Rotating the magnetic rotor induces a magnetic field into the metal blank such that the metal blank is heated.

20 Claims, 2 Drawing Sheets

(51) Int. Cl.

| | | |
|---|---|---|
| *B21C 47/18* | (2006.01) | |
| *B21C 47/34* | (2006.01) | |
| *H05B 6/10* | (2006.01) | |
| *B21C 47/16* | (2006.01) | |
| *B65H 29/00* | (2006.01) | |
| *B65H 29/20* | (2006.01) | |
| *B21D 37/16* | (2006.01) | |
| *C21D 1/42* | (2006.01) | |
| *F27D 99/00* | (2010.01) | |
| *H05B 6/32* | (2006.01) | |
| *H05B 6/36* | (2006.01) | |
| *B21B 39/02* | (2006.01) | |
| *B21B 39/34* | (2006.01) | |
| *B21C 37/02* | (2006.01) | |
| *C21D 1/04* | (2006.01) | |
| *C22C 21/02* | (2006.01) | |
| *C22C 21/06* | (2006.01) | |
| *C22C 21/10* | (2006.01) | |
| *C22C 21/12* | (2006.01) | |
| *B65G 54/02* | (2006.01) | |
| *C22F 1/02* | (2006.01) | |
| *H02N 15/00* | (2006.01) | |
| *F27D 19/00* | (2006.01) | |

(52) U.S. Cl.
CPC .......... *B21C 47/18* (2013.01); *B21C 47/3433* (2013.01); *B21C 47/3483* (2013.01); *B21D 22/022* (2013.01); *B21D 37/16* (2013.01); *B65H 29/006* (2013.01); *B65H 29/20* (2013.01); *C21D 1/42* (2013.01); *F27D 99/0001* (2013.01); *H05B 6/104* (2013.01); *H05B 6/32* (2013.01); *H05B 6/36* (2013.01); *B21C 37/02* (2013.01); *B65G 54/02* (2013.01); *C21D 1/04* (2013.01); *C22C 21/02* (2013.01); *C22C 21/06* (2013.01); *C22C 21/10* (2013.01); *C22C 21/12* (2013.01); *C22F 1/02* (2013.01); *F27D 2019/0003* (2013.01); *H02N 15/00* (2013.01); *Y02P 10/253* (2015.11)

(58) Field of Classification Search
CPC ...... B21D 37/16; B65H 29/006; B65H 29/20; C21D 1/42; F27D 99/0001; H05B 6/32; H05B 6/36; C22F 1/04
USPC ....................................................... 72/342.1
See application file for complete search history.

(56) References Cited

U.S. PATENT DOCUMENTS

| | | |
|---|---|---|
| 2,041,235 A | 5/1936 | Darbaker |
| 2,058,447 A | 10/1936 | Hazelett |
| 2,058,448 A | 10/1936 | Hazelett |
| RE21,260 E | 11/1939 | Hazelett |
| 2,448,009 A | 8/1948 | Baker |
| 2,448,012 A | 8/1948 | Baker |
| 2,481,172 A | 9/1949 | Staggs |
| 2,527,237 A | 10/1950 | Wilcox, Jr. |
| 2,566,274 A | 8/1951 | White et al. |
| 2,722,589 A | 11/1955 | Marquardt |
| 2,753,474 A | 7/1956 | Walworth et al. |
| 2,769,932 A | 11/1956 | Zozulin et al. |
| 2,895,034 A | 7/1959 | Baffrey et al. |
| 2,912,552 A | 11/1959 | Baermann |
| 3,008,026 A | 11/1961 | Kennedy |
| 3,272,956 A | 9/1966 | Baermann |
| 3,376,120 A | 4/1968 | Hiegel |
| 3,438,231 A | 4/1969 | Petzschke |
| 3,444,346 A | 5/1969 | Russell et al. |
| 3,453,847 A | 7/1969 | Romanauskas |
| 3,535,902 A | 10/1970 | Sevenich et al. |
| 3,562,470 A | 2/1971 | Bobart et al. |
| 3,604,696 A | 9/1971 | Coleman et al. |
| 3,635,417 A | 1/1972 | Kajiwara et al. |
| 3,793,867 A | 2/1974 | Safford |
| 4,054,770 A | 10/1977 | Jackson et al. |
| 4,185,183 A | 1/1980 | Kamimoto |
| 4,214,467 A | 7/1980 | Sankaran |
| 4,296,919 A | 10/1981 | Sakurai et al. |
| 4,321,444 A | 3/1982 | Davies |
| 4,448,614 A | 5/1984 | Morimoto et al. |
| 4,708,325 A | 11/1987 | Georges |
| 4,730,781 A | 3/1988 | Richter et al. |
| 4,743,196 A | 5/1988 | Imose et al. |
| 4,761,527 A * | 8/1988 | Mohr ..................... H05B 6/102 219/635 |
| 4,795,872 A | 1/1989 | Hagisawa et al. |
| 4,828,227 A | 5/1989 | Georges et al. |
| 4,891,484 A | 1/1990 | Waggott et al. |
| 4,923,396 A | 5/1990 | Harada et al. |
| 5,397,877 A | 3/1995 | Couffet et al. |
| 5,401,941 A | 3/1995 | Mauve et al. |
| 5,739,506 A | 4/1998 | Hanton et al. |
| 5,914,065 A | 6/1999 | Alavi |
| 6,011,245 A | 1/2000 | Bell |
| 6,019,200 A | 2/2000 | Janzen et al. |
| 6,129,136 A | 10/2000 | Tibbs et al. |
| 6,264,765 B1 | 7/2001 | Bryant et al. |
| 6,285,015 B1 | 9/2001 | Doizaki et al. |
| 6,327,883 B1 | 12/2001 | Noe et al. |
| 6,570,141 B2 | 5/2003 | Ross |
| 6,576,878 B2 | 6/2003 | Thorpe et al. |
| 7,525,073 B2 | 4/2009 | Lovens et al. |
| 7,671,307 B2 | 3/2010 | Nikanorov et al. |
| 7,819,356 B2 | 10/2010 | Takatsuka et al. |
| 8,502,122 B2 | 8/2013 | Hirota |
| 8,592,735 B2 | 11/2013 | Hirota |
| 9,462,641 B2 | 10/2016 | Akers |
| 2006/0070689 A1 | 4/2006 | Kropfl |
| 2007/0193322 A1* | 8/2007 | Beck ..................... B21B 37/28 72/11.7 |
| 2009/0101636 A1 | 4/2009 | Lovens et al. |
| 2010/0050730 A1 | 3/2010 | Buschsieweke et al. |
| 2010/0237548 A1 | 9/2010 | Okada et al. |
| 2012/0074132 A1 | 3/2012 | Chen et al. |
| 2014/0147697 A1 | 5/2014 | Berkhout et al. |
| 2016/0016215 A1 | 1/2016 | Brown et al. |
| 2018/0085803 A1 | 3/2018 | Hobbis et al. |
| 2018/0085805 A1 | 3/2018 | Pralong et al. |
| 2018/0087122 A1 | 3/2018 | Custers |
| 2018/0087138 A1 | 3/2018 | Gaensbauer et al. |
| 2018/0092163 A1 | 3/2018 | Pralong et al. |
| 2018/0092164 A1 | 3/2018 | Gaensbauer et al. |

FOREIGN PATENT DOCUMENTS

| | | |
|---|---|---|
| DE | 1163760 | 2/1964 |
| DE | 102006054383 A1 | 5/2008 |
| EP | 1221826 B1 | 2/2006 |
| EP | 1604549 B1 | 8/2006 |
| EP | 2112863 A1 | 10/2009 |
| EP | 2157193 A1 | 2/2010 |
| EP | 2233593 A2 | 9/2010 |
| EP | 2434836 A2 | 3/2012 |
| EP | 2800452 B1 | 7/2016 |
| FR | 1347484 A | 12/1963 |
| FR | 1387653 A | 1/1965 |
| FR | 2780846 A1 | 9/2000 |
| GB | 167545 A | 8/1921 |
| GB | 600673 A | 4/1948 |
| GB | 609718 A | 10/1948 |
| GB | 988334 A | 4/1965 |
| GB | 2114101 A | 8/1983 |
| GB | 2121260 A | 12/1983 |
| JP | S4934459 A | 3/1974 |
| JP | 5168460 | 6/1976 |
| JP | H02209457 A | 8/1990 |
| JP | H04112485 A | 4/1992 |
| JP | h0576932 | 3/1993 |

(56) References Cited

FOREIGN PATENT DOCUMENTS

| | | |
|---|---|---|
| JP | H0582248 A | 4/1993 |
| JP | h0549117 | 6/1993 |
| JP | g09122752 | 5/1997 |
| RU | 1784319 | 12/1992 |
| SU | 1316725 | 6/1987 |
| WO | 2007138152 A1 | 12/2007 |
| WO | 2015094482 A1 | 6/2015 |
| WO | 2016035867 A1 | 3/2016 |
| WO | 2016035893 A1 | 3/2016 |

OTHER PUBLICATIONS

The Aluminum Association, Inc., "International Alloy Designations and Chemical Composition Limits for Wrought Aluminum and Wrought Aluminum Alloys," Registration Record Series: Teal Sheets, Feb. 1, 2009, 35 pages, The Aluminum Association, Inc.
PCT/US2017/053665 , "International Preliminary Report on Patentability", dated Apr. 11, 2019, 11 pages.
Australian Application No. 2017335677, "First Examination Report", Sep. 9, 2019, 3 pages.

* cited by examiner

RAPID HEATING OF SHEET METAL BLANKS FOR STAMPING

The present application claims the benefit of U.S. Provisional Patent Application No. 62/400,426 entitled "ROTATING MAGNET HEAT INDUCTION" and filed on Sep. 27, 2016, and U.S. Provisional Patent Application No. 62/505,948 entitled "ROTATING MAGNET HEAT INDUCTION" and filed on May 14, 2017, the disclosures of which are hereby incorporated by reference in their entireties.

Additionally, the present application is related to U.S. Non-provisional patent application Ser. No. 15/716,692 to David Anthony Gaensbauer et al., entitled "MAGNETIC LEVITATION HEATING OF METAL WITH CONTROLLED SURFACE QUALITY" filed Sep. 27, 2017, and U.S. Non-provisional patent application Ser. No. 15/716,887 to Antoine Jean Willy Pralong et al., entitled "ROTATING MAGNET HEAT INDUCTION" filed Sep. 27, 2017, the disclosures of which are hereby incorporated by reference in their entirety.

FIELD OF THE INVENTION

This application relates to metal processing and, more particularly, systems and methods for rapid heating of metal blanks for hot forming.

BACKGROUND

Many applications may utilize metal products such as aluminum or aluminum alloys. As one example, metal products may be used in transportation applications, including automotive, aircraft, and railway applications. For example, metal products can be used to prepare automotive structural parts, such as bumpers, side beams, roof beams, cross beams, pillar reinforcements, inner panels, outer panels, side panels, inner hoods, outer hoods, or trunk lid panels. As another example, metal products may be used in electronics applications. For example, metal products can be used to prepare housing for electronic devices, including mobile phones and tablet computers. In some examples, metal products can be used to prepare housings for the outer casing of mobile phones (e.g., smart phones), tablet bottom chassis, and other portable electronics.

Various forming techniques may be employed to form the metal products having a particular shape. One such forming technique is hot forming or pressing. While hot forming may be used to shape various blanks, such as blanks of aluminum or high strength steel, a hot forming process with shorter cycle times to increase productivity and reduce costs associated with the hot forming process can be desired.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various embodiments of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

According to certain examples, a hot forming system includes a heater having a magnetic rotor. In various examples, the heater is configured to receive a blank of a metal substrate adjacent the magnetic rotor and rotate the magnetic rotor to induce a magnetic field in the blank to heat the blank.

According to certain examples, a method includes receiving a blank of a metal substrate at a heater and positioning the blank adjacent a magnetic rotor of the heater. In some examples, the method includes rotating the magnetic rotor to induce a magnetic field in the blank to heat the blank for a predetermined time period.

According to certain examples, a method includes receiving a blank of a metal substrate at a heater. In certain examples, the heater includes a magnetic rotor. In some examples, the method includes positioning the blank adjacent the magnetic rotor of the heater. In various examples, the method includes rotating the magnetic rotor to induce a magnetic field in the blank to heat the blank. In some cases, the method includes removing the blank from the heater when the blank is at a predetermined temperature.

Various implementations described in the present disclosure can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The features and components of the following figures are illustrated to emphasize the general principles of the present disclosure. Corresponding features and components throughout the figures can be designated by matching reference characters for the sake of consistency and clarity.

DETAILED DESCRIPTION

Figure 1:
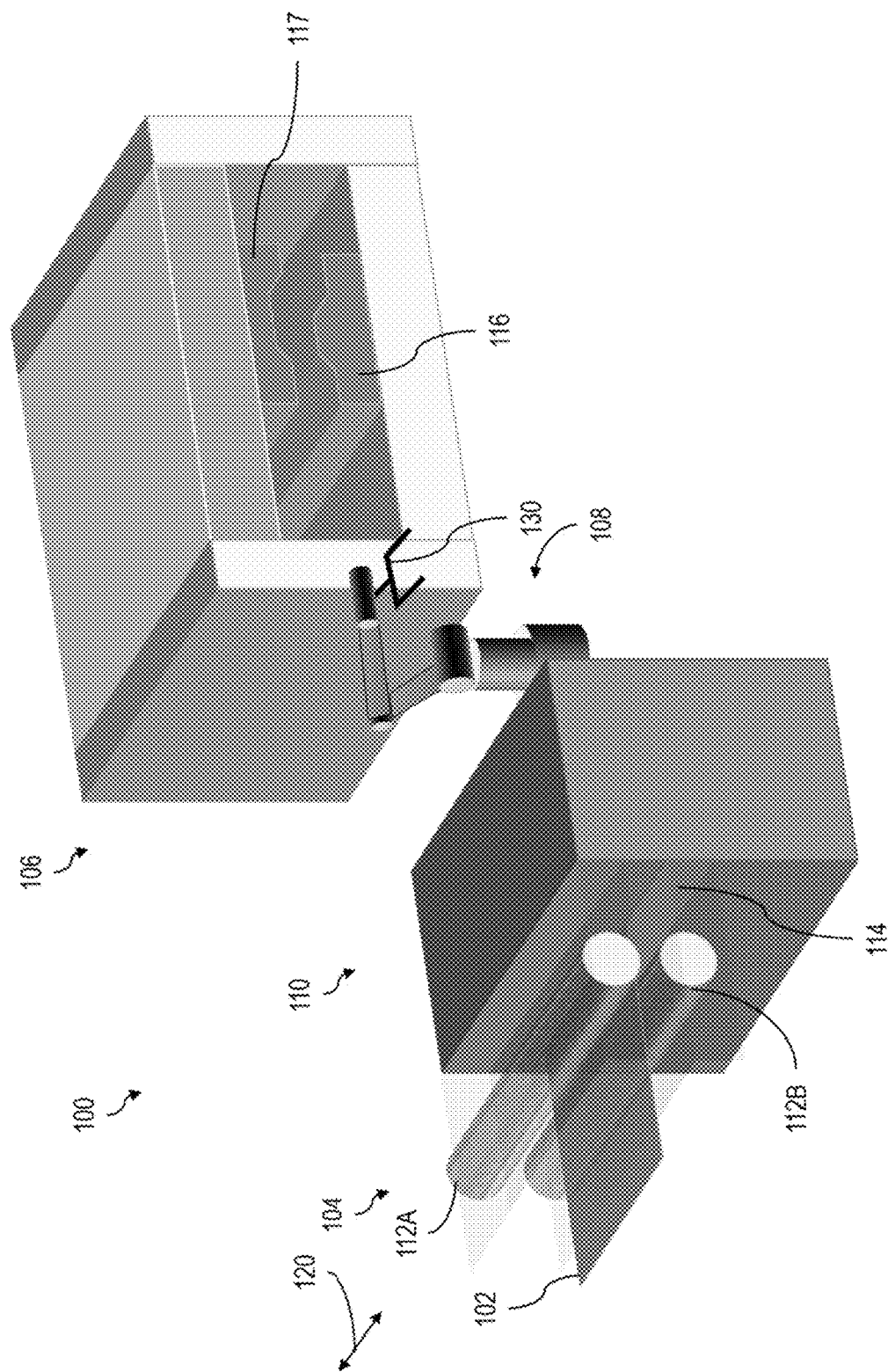
FIG. 1 is a perspective schematic view of a hot forming system including a heater according to aspects of the current disclosure.

The subject matter of examples of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

Many metalworking techniques may be used to form a blank or strip of a material into a final desired shape for various applications such as transportation and automotive, electronics, and various other applications. One such metalworking technique for blanks or strips of material such as high strength steel and aluminum is hot forming. During hot forming, a blank, such as a blank of steel or aluminum or other material, is positioned into a hot forming press, and a die surface shapes the blank as the blank is pressed by the hot forming press. Oftentimes, to facilitate the hot forming process, the blanks are heated prior to pressing. However, conventional heaters require longer cycle times to adequately heat the metal blanks. For example, conventional heaters typically require about 10-20 minutes to heat up aluminum blanks depending on the size and thickness of the aluminum blank. This prolonged heat up time results in a longer overall cycle time of the blank, which increases the costs associated with the hot forming process.

Disclosed are systems and methods for hot forming of a blank and preparing a blank for hot forming. In some examples, the systems and methods include using magnetic heating to preheat the blank before hot forming. Aspects and features of the present disclosure can be used with various suitable metal blanks, and may be especially useful with metal blanks of aluminum or aluminum alloys. Specifically, desirable results can be achieved when the metal blanks are alloys such as 2xxx series, 3xxx series, 4xxx series, 5xxx series, 6xxx series, 7xxx series, or 8xxx series aluminum alloys. For an understanding of the number designation system most commonly used in naming and identifying aluminum and its alloys, see "International Alloy Designations and Chemical Composition Limits for Wrought Aluminum and Wrought Aluminum Alloys" or "Registration Record of Aluminum Association Alloy Designations and Chemical Compositions Limits for Aluminum Alloys in the Form of Castings and Ingot," both published by The Aluminum Association.

Reference is made in this application to alloy temper or condition. For an understanding of the alloy temper descriptions most commonly used, see "American National Standards (ANSI) H35 on Alloy and Temper Designation Systems." An F condition or temper refers to an aluminum alloy as fabricated. An O condition or temper refers to an aluminum alloy after annealing. A T4 condition or temper refers to an aluminum alloy after solution heat treatment (i.e., solutionization) followed by natural aging. A T6 condition or temper refers to an aluminum alloy after solution heat treatment followed by artificial aging. A T7 condition or temper refers to an aluminum alloy after solution heat treatment and then followed by overaging or stabilizing. A T8 condition or temper refers to an aluminum alloy after solution heat treatment, followed by cold working and then by artificial aging. A T9 condition or temper refers to an aluminum alloy after solution heat treatment, followed by artificial aging, and then by cold working. An H1 condition or temper refers to an aluminum alloy after strain hardening. An H2 condition or temper refers to an aluminum alloy after strain hardening followed by partial annealing. An H3 condition or temper refers to an aluminum alloy after strain hardening and stabilization. A second digit following the HX condition or temper (e.g. H1X) indicates the final degree of strain hardening.

Aspects and features of the present disclosure include hot forming systems and methods having a heater that includes one or more magnetic rotors arranged above and/or below a blank to induce moving or time varying magnetic fields through the blank. The changing magnetic fields can create currents (e.g., eddy currents) within the blank, thus heating the blank.

In some cases, the magnetic rotors disclosed herein may be used with non-ferrous materials, including aluminum, aluminum alloys, magnesium, magnesium-based materials, titanium, titanium-based materials, copper, copper-based materials, steel, steel-based materials, bronze, bronze-based materials, brass, brass-based materials, composites, sheets used in composites, or any other suitable metal, non-metal or combination of materials. The article may include monolithic materials, as well as non-monolithic materials such as roll-bonded materials, clad materials, composite materials (such as but not limited to carbon fiber-containing materials), or various other materials. In one non-limiting example, the magnetic rotors can be used to heat metal articles such as aluminum metal strips, slabs, blanks, or other articles made from aluminum alloys, including aluminum alloys containing iron.

Each magnetic rotor includes one or more permanent magnets or electromagnets. In some examples, a pair of matched magnetic rotors can be positioned on opposite sides of a passline of the blank. In other examples, one or more magnetic rotors are positioned above or below the passline. The magnetic rotors are rotatable in a forward direction or a reverse direction, and may be rotated through various suitable methods including, but not limited to, electric motors, pneumatic motors, another magnetic rotor, or various other suitable mechanisms. The direction and rotational speed of the magnetic rotors may be adjusted and controlled as needed. In some examples, the magnetic rotors are positioned a predetermined distance from the passline. In certain cases, the distance between the magnetic rotors and the passline may be adjusted and controlled as needed.

Precise heating control for hot forming treatment can be achieved when using the heater. Such precise control can be achieved through manipulation of various factors, including strength of magnets in the rotor, number of magnets in the rotor, orientation of magnets in the rotor, size of magnets in the rotor, speed of the rotor, the direction of rotation in the forward direction or reverse direction, size of the rotor, vertical gap between vertically offset rotors in a single rotor set, laterally offset placement of rotors in a single rotor set, longitudinal gap between adjacent rotor sets, thickness of the blank being heated, distance between the rotor and the blank, forward speed of the blank being heated, and number of rotors sets used. Other factors can be controlled as well. In some cases, the heater is a fast response heater because the rotation of the magnets may be stopped and started depending on whether a metal blank is within the heater to quickly heat or stop heating a metal blank. In some cases, control of one or more of the aforementioned factors, among others, can be based on a computer model, operator feedback, or automatic feedback (e.g., based on signals from real-time sensors).

As used herein, the terms "above," "below," "vertical," and "horizontal" are used to describe relative orientations with respect to a metal strip or blank as if the metal strip or blank were moving in a horizontal direction with its top and bottom surfaces generally parallel to the ground. The term "vertical" as used herein can refer to a direction perpendicular to a surface (e.g., top or bottom surface) of the metal strip or blank, regardless of the orientation of the metal strip or blank. The term "horizontal" as used herein can refer to a direction parallel to a surface (e.g., top or bottom surface) of the metal strip or blank, such as a direction parallel to the direction of travel of a moving metal strip or blank, regardless of the orientation of the metal strip or blank. The terms "above" and "below" can refer to locations beyond top or bottom surfaces of a metal strip, regardless of the orientation of the metal strip or blank.

Figure 2:
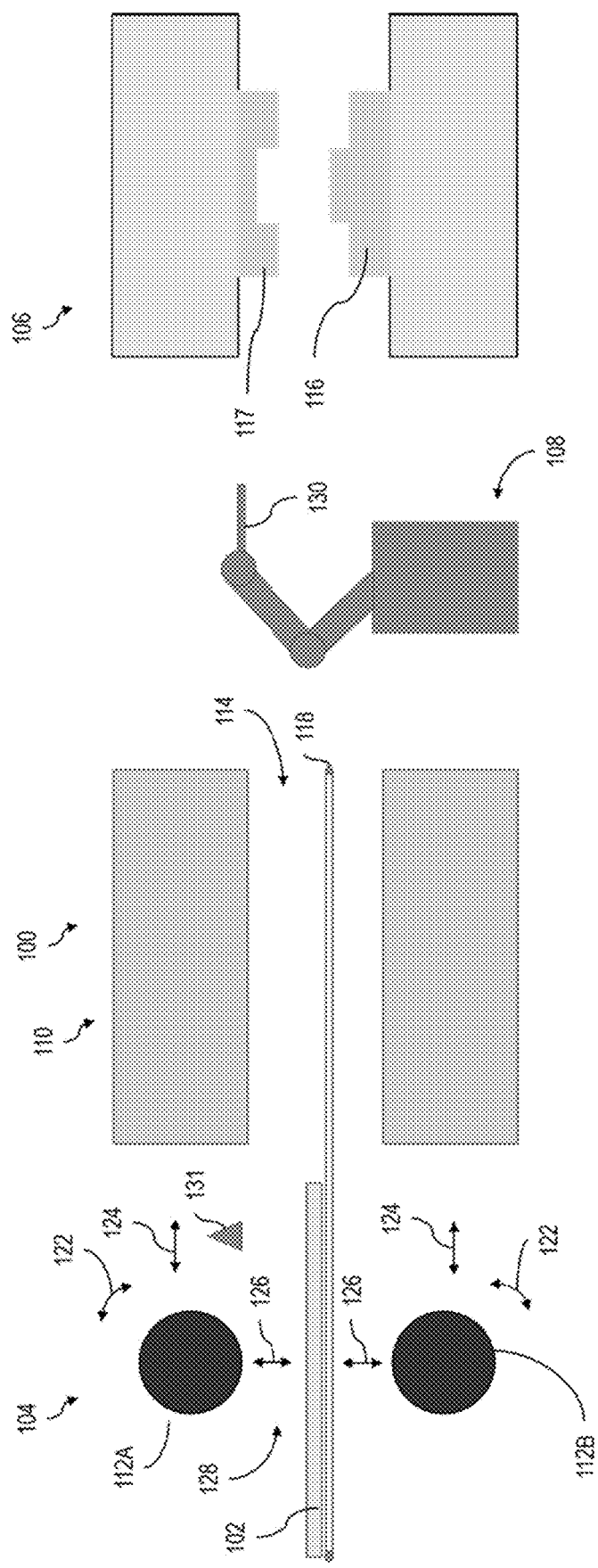
FIG. 2 is a side schematic view of the system of FIG. 1.

An example of a hot forming system 100 for blanks 102 is schematically illustrated in FIGS. 1 and 2. Although the system 100 is described as a hot forming system, it will be appreciated that the system 100 may also be a warm forming system where the forming temperatures are not as high as in the hot forming system.

As illustrated in FIGS. 1 and 2, the hot forming system 100 includes a heater 104 and a hot forming press 106. In some examples, the hot forming system 100 includes a blank mover 108. The heater 104 may be orientated in various directions relative to the ground, such as vertically, diagonally, or horizontally, and is not limited to the orientation shown in FIGS. 1 and 2. For example, the heater 104 may be oriented vertically (and the blank 102 passes vertically through the heater 104), diagonally (and the blank 102 passes through the heater 104 at an angle relative to the ground), horizontally, or various other orientations or combinations of orientations.

In some examples, the hot forming system 100 optionally also includes a second heater 110. During a hot forming process, the blank 102 is heated by the heater 104, optionally heated by the second heater 110, moved to the hot forming press 106 by the blank mover 108, and formed into a predetermined shape using the hot forming press 106.

As illustrated in FIGS. 1 and 2, the heater 104 includes at least one magnetic rotor 112, and in certain examples, the heater 104 includes more than one magnetic rotor 112. For example, the heater 104 may include one magnetic rotor 112, two magnetic rotors 112, three magnetic rotors 112, four magnetic rotors 112, five magnetic rotors 112, six magnetic rotors 112, or more than six magnetic rotors 112. As such, the number of magnetic rotors 112 should not be considered limiting on the current disclosure. In the non-limiting example illustrated in FIGS. 1 and 2, the heater 104 includes two magnetic rotors 112.

Each magnetic rotor 112 includes one or more permanent magnets or electromagnets. The magnetic rotors 112 are rotatable (see arrows 122 in FIG. 2) in a forward direction (a clockwise direction in FIG. 2) or a reverse direction (a counter-clockwise direction in FIG. 2). In various examples, the magnetic rotors 112 may be rotated through various suitable methods including, but not limited to, electric motors, pneumatic motors, another magnetic rotor, or various other suitable mechanisms.

The magnetic rotors 112 are spaced apart from the passline of the blank 102 such that, during processing, the magnetic rotors 112 are in a non-contacting configuration with the blank 102. In various examples, the magnetic rotors 112 are vertically adjustable such that a distance between a particular magnetic rotor 112 and the blank 102 (or passline of the blank 102) may be adjusted and controlled.

In some examples, the magnetic rotors 112 are provided as a set having a top magnetic rotor 112A positioned above the passline and a bottom magnetic rotor 112A positioned below the passline. In other examples, the heater 104 includes only bottom magnetic rotors 112B, only top magnetic rotors 112A, or various combinations of top magnetic rotors 112A and bottom magnetic rotors 112B. In some examples, at least one top magnetic rotor 112A is horizontally aligned with a corresponding bottom magnetic rotor 112B, although it need not be. In certain examples, the top magnetic rotor 112A is vertically offset from a corresponding bottom magnetic rotor 112B such that a gap 128 (FIG. 2) is defined between the magnetic rotors 112A-B. As illustrated in FIGS. 1 and 2, during processing, the blank 102 is passed through the gap 128. In other cases, the top magnetic rotor 112A may be horizontally offset relative to a bottom magnetic rotor 112B.

In various examples, the top magnetic rotor 112A and the bottom magnetic rotor 112B are vertically adjustable such that a size of the gap 128, which is a distance from the top magnetic rotor 112A to the bottom magnetic rotor 112B, may be adjusted and controlled (see arrows 126 in FIG. 2). In various examples, the gap 128 may be controlled through various actuators including, but not limited to, hydraulic pistons, screw drives, or other suitable examples. In certain examples, the gap 128 may be varied between a minimum gap size and a maximum gap size. In some cases, the strength of the magnetic field, and thus the amount of heat imparted into the blank 102, may be controlled by changing the distance between the magnetic rotors 112A-B and the blank 102. In various examples, the top magnetic rotor 112A may be vertically adjustable independent from or in conjunction with the bottom magnetic rotor 112B. As mentioned above, the strength of the magnetic field, and thus the amount of heat imparted into the blank 102, can be adjusted in other or additional ways.

In certain examples, the magnetic rotors 112A-B may be adjusted laterally (see arrows 120 in FIG. 1). Lateral movement can control the percentage of the surface of the blank 102 covered by a particular rotor 112A-B, and therefore the amount and location of the heat imparted into the blank 102. In certain examples, the magnetic rotors 112A-B may be laterally adjusted to control the temperature profile in the blank 102. For example, in some cases, edges of the blank 102 may be heated more rapidly than non-edge portions of the blank 102, and the magnetic rotors 112A-B may be laterally adjusted such that the temperature variation in the blank 102 is reduced. In various examples, the magnetic rotors 112A-B may be longitudinally adjustable to control the gap between adjacent sets of magnetic rotors 112 (see arrows 124 in FIG. 2) and/or to control the longitudinal position of the magnetic rotors 112 relative to the blank 102.

In some examples, the top magnetic rotor 112A and the bottom magnetic rotor 112B rotate in the same direction, although they need not. For example, in some cases, the top magnetic rotor 112A and the bottom magnetic rotor 112B may rotate in opposite directions. In various examples, the magnetic rotors 112A-B of one set of magnetic rotors may rotate in the same or in a different direction as the corresponding magnetic rotors 112A-B of another set of magnetic rotors. The magnetic rotors 112A-B may rotate at various rotational speeds, such as from about 100 rpm to about 5000 rpm. In one non-limiting example, the magnetic rotors 112A-B rotate at about 1800 revolutions per minute, although various other rotational speeds may be utilized. As the magnetic rotors 112A-B rotate, the magnets induce a magnetic field into the blank 102 such that the blank 102 is heated. In various examples, through the rotation of the magnetic rotors 112, the heater 104 is configured to heat the blank 102.

In certain examples with multiple magnetic rotors 112A-B, the magnetic rotors 112A-B may optionally be controlled such that the amount of temperature rise of the blank 102 imparted by each magnetic rotor 112A-B is limited. In some examples, in addition to heating the blank 102, rotating the magnetic rotors 112A-B may also provide vertical stabilization that allows the blank 102 to pass over and/or between the magnetic rotors 112 without contacting the magnetic rotors 112A-B (e.g., the magnetic rotors 112A-B levitate or float the blank 102). For example, in some cases, the magnetic rotors 112A-B impart a force that is perpendicular or substantially perpendicular to a surface of the blank 102 to float the blank 102 and minimize and/or eliminate contact between the rotors 112A-B and the blank 102.

In other cases, the blank 102 may be supported by a support 118 in the heater 104. The support 118 may be a platform, brackets, conveyor, or various other suitable support structures. In some cases, the support 118 is configured to laterally position the blank 102 relative to the heater 104, the second heater 110, or both heaters 104 and 110. In certain cases, the support 118 may advance the blank 102 through the heater 104 and optionally through the second heater 110, although it need not.

In various examples, the heater 104 is configured to heat the blank 102 for a predetermined time period. In various examples, the predetermined time period may include a heat up time and a soaking time, although it need not. In some non-limiting examples, the heater 104 heats the blank 102 for about 30 seconds to 20 minutes. In one non-limiting example, the predetermined time period is from about 30 seconds to about 6 minutes. In other examples, the predetermined time period may be greater than 20 minutes. In one non-limiting example where the heater 104 is the entire apparatus (e.g., the second heater 110 is omitted), the predetermined time period may include the heat up time and the soaking time. In other examples, where the second heater 110 is included, the predetermined time period may include the time that the blank 102 is heated by both the heater 104 and the second heater 110, although it need not.

In various examples, the heater 104 heats the blank 102 to a predetermined temperature. In some non-limiting examples, the predetermined temperature is a solutionizing temperature of the blank 102, although it need not be. For example, in other non-limiting cases, the predetermined temperature may be a warming temperature, or various other temperatures. In other examples, the predetermined temperature is less than the solutionizing temperature of the blank. In certain non-limiting examples, the heater 104 heats the blank 102 to a temperature of from about 200° C. to about 600° C. In other examples, the heater 104 may heat the blank 102 to a temperature of less than 200° C. or greater than 600° C. depending on particular application. As one non-limiting example, the heater 104 may heat a 7xxx series aluminum alloy blank 102 to a temperature of from about 400° C. to about 500° C. As another non-limiting example, the heater 104 may heat a 6xxx series aluminum alloy blank to a temperature of from about 400° C. to about 600° C. As a further non-limiting example, the heater 104 may be provided for warm forming of metal blanks or sheets having various tempers. As one non-limiting example, the heater 104 may heat a T6 sheet to a temperature of from about 200° C. or 300° C. depending on the particular alloys of the sheet.

In various examples, the blank 102 can make multiple passes through the heater 104 (or through each set of magnetic rotors 112A-B of the heater 104). In various examples, the blank 102 can make an odd number of passes through the heater 104 (or each set of magnetic rotors 112A-B of the heater 104). For example, the blank 102 can make one pass through the heater 104, three passes through the heater 104, five passes through the heater 104, seven passes through the heater 104, or more than seven passes through the heater 104. In certain examples, two or more sets of magnetic rotors 112A-B may be arranged in various suitable configurations such that the blank 102 makes a single pass (or any desired number of passes) through the heater 104. In other examples, the blank 102 can make an even number of passes through the heater 104 (or each set of magnetic rotors 112A-B of the heater 104) depending on a configuration and arrangement of the magnetic rotors 112A-B.

In some optional cases, the hot forming system 100 includes the second heater 110. In various examples, the second heater 110 is arranged such that the blank 102 is first heated by the heater 104 and then heated by the second heater 110. In such examples, the second heater 110 may optionally be used for homogenizing the blank temperature, such as the blank solutionizing temperature. In other examples, the order of the heater 104 and the second heater 110 may be reversed. The second heater 110 includes a blank-receiving area 114. In some cases, the support 118 may support the blank 102 when the blank is in the blank-receiving area 114. In other examples, a different support from the support 118 may support the blank 102. In some examples, the second heater 110 may be a gas-powered heater (direct such as direct flame impingement or indirect), a roller furnace, an induction heater, an infrared heater, an electric furnace, or various other suitable types of heaters. In various other examples, the second heater 110 may be similar to the heater 104 and include one or more magnetic rotors 112. As one non-limiting example, the second heater 110 may be a roller furnace that includes magnetic rotors 112, which may significantly shorten the length of the roller furnace. In various examples, the second heater 110 may heat the blank 102 for a predetermined time period. As previously described, in some cases, the predetermined time period includes the time that the blank 102 is heated by both the heater 104 and the second heater 110, although it need not. In certain examples, the second heater 110 may heat the blank 102 for a time period of from about 30 seconds to about 20 minutes.

In certain examples, by providing the second heater 110 with the heater 104, the temperature profile in the blank 102 can be controlled. For example, in some cases, the heater 104 may heat the blank 102 to a first temperature that is less than the solutionizing temperature, and the second heater 110 may heat the blank 102 from the first temperature to the solutionizing temperature. In some examples, the heater 104 may heat the blank 102 for a first time period and the second heater 110 may heat the blank for a second time period. In some examples, the amount of time that the heater 104 heats the blank 102 may depend on various factors including, but not limited to, a size and/or thickness of the blank 102, a number of magnetic rotors 112, the number of passes of the blank 102 through the heater 104, the rotating speed of the magnetic rotors 112, the rotating direction of the magnetic rotors 112, a distance from the magnetic rotors 112 to the blank 102, or various other factors. In certain examples, the heater 104 heats the blank 102 such that significant distortions are not introduced to the blank 102. As one non-limiting example, the heater 104 may heat the blank 102 for a time period of from about 1 second to about 30 seconds. In other examples, the heater 104 may heat the blank 102 for more than 30 seconds.

In other examples, the second heater 110 may be provided to control the temperature profile of the blank 102. As one non-limiting example, in some cases, heating the blank 102 with the heater 104 may cause the blank 102 to have a varied temperature profile. For example, in some non-limiting cases, the edges of the blank 102 may have a temperature that is greater than a temperature of a non-edge portion of the blank 102. In some cases, the second heater 110 may heat the blank 102 after the heater 104 to control the temperature profile of the blank 102. As one non-limiting example, the second heater 110 may heat the blank 102 such that the blank 102 has a uniform temperature profile.

The blank mover 108 may be provided at various locations to move the blank 102 between various components of the hot forming system 100. For example, in some cases, the blank mover 108 is provided between the second heater 110 and the hot forming press 106 to move the blank 102 between the second heater 110 and the hot forming press 106. Similarly, the blank mover 108 (or another blank mover 108) may be provided between the heater 104 and the second heater 110 to move the blank 102 from the heater 104 to the second heater 110.

The blank mover 108 includes a support 130 for supporting the blank 102. In various components, the blank mover 108 may be various suitable mechanisms or devices for moving the blank 102 between various components of the hot forming system 100. As one non-limiting example, the blank mover 108 may include a robotic arm that supports and moves the blank 102. In other examples, other types of blank movers 108 may be utilized. As such, the number and type of blank mover 108 should not be considered limiting on the current disclosure.

The hot forming press 106 includes a die 116 and a tool 117. The die 116 has a predetermined shape such that when the blank 102 is positioned within the hot forming press 106, the tool 117 moves towards the die 116 and forms the blank 102 into the shape defined by the die 116. In some examples, the hot forming press 106 may hot form the blank 102 at a predetermined press speed. In some non-limiting examples, the predetermined press speed may be from about 100 mm/second to about 400 mm/second, although various other press speeds may be utilized. In various examples, the hot forming press 106 may be a hydraulic press, mechanical press, servo-controlled press, or various other suitable types of presses. In some examples, the die 116 is a water-cooled die. In some cases, the die 116 could be a warm die and/or have a controllable temperature profile. As one non-limiting example, in some cases, such as during forming steel, the die 116 may be heated in some zones of the die 116 and cooled in other zones of the die 116 in order to achieve different final properties in different part locations when the blank 102 is formed into the shape defined by the die 116. As previously described, in some examples, the system 100 may be a warm forming system. In such cases, the press 106 is a warm forming press, and the forming temperature is not as high as with the hot forming press. In some cases, the system 100 may include blow forming at elevated temperatures in addition to or in place of the hot forming press 106 having the die 116. During blow forming, the preheated blank 102 is introduced to the tool and then deformed with hot gas at various pressures.

In certain examples, the hot forming system 100 includes various sensors or monitors 131 at various positions relative to the heater 104. These sensors 131 may detect and monitor a position of the blank 102, movement of the blank 102, a temperature of the blank 102, a temperature distribution across the blank 102, and/or various other information about the blank 102 as it is processed. In some examples, the information gathered by the sensors may be used by a controller to adjust the magnetic rotors 112A-B (e.g., rotational speed, direction of rotation, distance from blank 102, etc.) and thereby control heating of the blank 102. In some examples, the controller may adjust the number of passes of the blank 102 through the heater 104.

As one example, the heater 104 may be controlled to reduce or prevent overheating of the blank 102 and/or to control activation and deactivation of the magnetic rotors 112A-B. For example, the magnetic rotors 112A-B may be deactivated (i.e., stop rotating) if a blank 102 is not within the heater 104, after the blank 102 has been heated for the predetermined time period, after the blank 102 has been heated to a predetermined temperature, or various other factors. Similarly, the magnetic rotors 112A-B may start rotating again or continue to rotate (and thus start heating the blank 102 again) based on if a blank is proximate the heater 104, the temperature of the blank 102 being less than the predetermined temperature, the blank 102 being heated for a time period less than the predetermined time period, or various other factors. Accordingly, through the magnetic rotors 112A-B, the heater 104 may rapidly heat or stop heating the blank 102.

As another example, the heaters 104 and/or 110 may be controlled to ensure a uniform or desired temperature profile of the blank 102. For example, the sensor or monitor 131 may detect a temperature of the blank 102 as it exits the heater 104. Based on the detected temperature, the magnetic rotors 112 may be controlled (e.g., by adjusting power input to the magnetic rotors 112, speed of the magnetic rotors 112A-B, distance of the magnetic rotors 112A-B from the blank 102, etc.) and/or the second heater 110 may be controlled to control the temperature of the blank 102 and/or temperature across the blank 102.

As a further example, the heater 104 may be controlled to accommodate different types of blanks 102. For example, depending on the type of blank 102 and/or desired process or product requirements, the blank 102 may be heated by the heater 104 and/or the heater 110 at different processing times, processing temperatures, etc. By controlling the magnetic rotors 112A-B, the temperature can be changed more quickly than conventional heaters.

Referring to FIGS. 1 and 2, a method of hot forming the metal blank 102 is also disclosed. In various examples, the method includes receiving the blank 102 of a metal substrate at the heater 104. In some non-limiting examples, the blank 102 includes aluminum or an aluminum alloy.

The method includes positioning the blank 102 adjacent to the magnetic rotors 112A-B of the heater 104 and rotating the magnetic rotors 112A-B to induce a magnetic field into the blank 102 to heat the blank 102. In some examples, the blank 102 is heated for a predetermined time period. For example, in some non-limiting examples, the blank 102 is heated for about 30 seconds about 20 minutes In some examples, the predetermined time period may depend on a size and/or thickness of the blank 102 among other factors. In other examples, the blank 102 is heated to a predetermined temperature. For example, in some non-limiting cases, the blank 102 is heated to a temperature of from about 200° C. to about 600° C. In some examples, the predetermined temperature is a solutionizing temperature of the blank 102. The solutionizing temperature may depend on the particular material composition of the blank 102. As one non-limiting example, the heater 104 may heat a 7xxx series aluminum alloy blank 102 to a temperature of from about 400° C. to about 500° C. As another non-limiting example, the heater 104 may heat a 6xxx series aluminum alloy blank to a temperature of from about 400° C. to about 600° C. In some examples, the solutionizing temperature may depend on a size and/or thickness of the blank 102 among other factors.

In certain cases, positioning the blank 102 includes positioning the blank 102 on the support 118. In some examples, the method includes moving the blank 102 laterally with the support 118 relative to the magnetic rotors 112A-B while maintaining the lateral position of the magnetic rotors 112A-B. In other examples, positioning the blank 102 includes positioning the blank 102 on the support 118 and lateral moving the magnetic rotors 112A-B relative to the blank 102 while maintaining the lateral position of the blank 102.

In some examples, the method includes adjusting the magnetic field to adjust an amount of heat induced into the blank 102 by the magnetic rotors 112A-B. In certain examples, adjusting the magnetic field includes adjusting a rotational speed of the magnetic rotors 112A-B, adjusting a direction of rotation of the magnetic rotors 112A-B, adjusting a vertical position of the magnetic rotors 112A-B relative to the blank 102, adjusting a lateral position of the magnetic rotors 112A-B relative to the blank 102, and/or adjusting a longitudinal position of the magnetic rotors 112A-B relative to the blank 102. In various cases, the method includes detecting a temperature of the blank 102, such as with the sensor 131, comparing the detected temperature to a predetermined temperature, and adjusting the magnetic rotor 112A-B to adjust the heating of the blank 102 such that the detected temperature matches the predetermined temperature. In various examples, positioning the blank 102 includes positioning the blank 102 a predetermined distance from the magnetic rotors 112A-B.

In various examples, the method optionally includes removing the blank 102 from the heater 104, positioning the blank 102 in the second heater 110, and heating the blank 102 with the second heater 110. In various examples, heating the blank 102 with the second heater 110 includes controlling a temperature profile of the blank 102. In certain examples, heating the blank 102 with the second heater 110 includes heating the blank 102 to the solutionizing temperature of the blank 102. In some cases, removing the blank 102 from the heater 104 and positioning the blank 102 in the second heater 110 includes moving the blank on the support 118. In some examples, the support 118 is a conveyor or other suitable support for moving the blank 102 from the heater 104 to the second heater 110.

In some examples, the method includes removing the blank 102 from the heater 104 (or heater 110) after the heater 104 (or heater 110) heats the blank 102. In certain examples, the blank 102 is removed after the predetermined time period and/or after the blank 102 is at the predetermined temperature. In certain examples, the method includes using the blank mover 108 to move the blank 102 from the heater 104 to the hot forming press 106. In some cases, the method includes hot forming the blank 102 with the hot forming press 106. In certain cases, hot forming the blank 102 includes positioning the blank 102 on the die 116 of the hot forming press 106 and pressing the blank 102 with the hot forming press 106 such that the die 116 shapes the blank 102.

A collection of exemplary embodiments, including at least some explicitly enumerated as "ECs" (Example Combinations), providing additional description of a variety of embodiment types in accordance with the concepts described herein are provided below. These examples are not meant to be mutually exclusive, exhaustive, or restrictive; and the invention is not limited to these example embodiments but rather encompasses all possible modifications and variations within the scope of the issued claims and their equivalents.

EC 1. A method comprising: receiving a blank of a metal substrate at a heater, wherein the heater comprises a magnetic rotor; positioning the blank adjacent the magnetic rotor of the heater; and rotating the magnetic rotor to induce a magnetic field in the blank to heat the blank for a predetermined time period.

EC 2. The method of any of the preceding or subsequent example combinations, wherein rotating the magnetic to induce the magnetic field in the blank to heat the blank for the predetermined time period comprises heating the blank to a predetermined temperature, and wherein the predetermined temperature is a solutionizing temperature of the blank.

EC 3. The method of any of the preceding or subsequent example combinations, wherein the predetermined temperature is from about 200° C. to about 600° C.

EC 4. The method of any of the preceding or subsequent example combinations, further comprising removing the blank from the heater after the predetermined time period.

EC 5. The method of any of the preceding or subsequent example combinations, wherein removing the blank comprises using a mover to remove the blank from the heater to a hot forming press.

EC 6. The method of any of the preceding or subsequent example combinations, further comprising hot forming the blank into a predetermined shape with the hot forming press.

EC 7. The method of any of the preceding or subsequent example combinations, wherein the hot forming press comprises a water-cooled die.

EC 8. The method of any of the preceding or subsequent example combinations, wherein positioning the blank comprises moving the blank with a mover relative to the magnetic rotor while maintaining a lateral position of the magnetic rotor.

EC 9. The method of any of the preceding or subsequent example combinations, wherein positioning the blank comprises moving the magnetic rotor relative to the metal blank while maintaining the lateral position of the metal blank.

EC 10. The method of any of the preceding or subsequent example combinations, further comprising adjusting the magnetic field to adjust an amount of heat induced by the magnetic rotor.

EC 11. The method of any of the preceding or subsequent example combinations, wherein adjusting the magnetic field comprises at least one of adjusting a rotational speed of the magnetic rotor, adjusting a direction of rotation of the magnetic rotor, adjusting a vertical position of the magnetic rotor relative to the blank, adjusting a lateral position of the magnetic rotor relative to the blank, or adjusting a longitudinal position of the magnetic rotor relative to the blank.

EC 12. The method of any of the preceding or subsequent example combinations, wherein adjusting the magnetic field comprises: detecting a temperature of the blank; comparing the detected temperature to a predetermined temperature; and adjusting the magnetic rotor to adjust the heating of the blank such that the detected temperature matches the predetermined temperature.

EC 13. The method of any of the preceding or subsequent example combinations, wherein positioning the blank adjacent the magnetic rotor comprises positioning the blank a predetermined distance from the magnetic rotor.

EC 14. The method of any of the preceding or subsequent example combinations, wherein the magnetic rotor is a top magnetic rotor, wherein the heater further comprises a bottom magnetic rotor vertically offset from the top magnetic rotor, wherein passing the blank adjacent a magnetic rotor comprises passing the blank through a gap defined between the top magnetic rotor and the bottom magnetic rotor, and wherein rotating the magnetic rotor comprises rotating the top magnetic rotor and the bottom magnetic rotor to heat the blank.

EC 15. The method of any of the preceding or subsequent example combinations, wherein the predetermined time period is from about 30 seconds to about 20 minutes.

EC 16. The method of any of the preceding or subsequent example combinations, wherein the heater is a first heater, and wherein the method further comprises: removing the blank from the first heater after the predetermined time period; positioning the blank in a second heater; and heating the blank with the second heater.

EC 17. The method of any of the preceding or subsequent example combinations, wherein heating the blank with the second heater further comprises controlling a temperature profile of the blank.

EC 18. The method of any of the preceding or subsequent example combinations, wherein the second heater comprises a gas-powered heater, an infrared heater, a roller furnace, an electric furnace, or an induction heater.

EC 19. The method of any of the preceding or subsequent example combinations, wherein heating the blank with the second heater comprises heating the blank to a solutionizing temperature of the blank.

EC 20. The method of any of the preceding or subsequent example combinations, wherein removing the blank from the first heater and positioning the blank in the second heater comprises moving the blank with a mover.

EC 21. The method of any of the preceding or subsequent example combinations, wherein the mover is a conveyor.

EC 22. The method of any of the preceding or subsequent example combinations, wherein the blank comprises aluminum.

EC 23. A method comprising: receiving a blank of a metal substrate at a heater, wherein the heater comprises a magnetic rotor; positioning the blank adjacent the magnetic rotor of the heater; rotating the magnetic rotor to induce a magnetic field in the blank to heat the blank; and removing the blank from the heater when the blank is at a predetermined temperature.

EC 24. The method of any of the preceding or subsequent example combinations, wherein the predetermined temperature is a solutionizing temperature of the blank.

EC 25. The method of any of the preceding or subsequent example combinations, wherein the predetermined temperature is from about 200° C. to about 600° C.

EC 26. The method of any of the preceding or subsequent example combinations, wherein removing the blank comprises using a mover to remove the blank from the heater to a hot forming press.

EC 27. The method of any of the preceding or subsequent example combinations, further comprising hot forming the blank with the hot forming press.

EC 28. The method of any of the preceding or subsequent example combinations, wherein the hot forming press comprises a water-cooled die.

EC 29. The method of any of the preceding or subsequent example combinations, wherein positioning the blank comprises moving the blank with a mover relative to the magnetic rotor while maintaining a lateral position of the magnetic rotor.

EC 30. The method of any of the preceding or subsequent example combinations, wherein positioning the blank comprises moving the magnetic rotor relative to the metal blank while maintaining the lateral position of the metal blank.

EC 31. The method of any of the preceding or subsequent example combinations, further comprising adjusting the magnetic field to adjust an amount of heat induced by the magnetic rotor.

EC 32. The method of any of the preceding or subsequent example combinations, wherein adjusting the magnetic field comprises at least one of adjusting a rotational speed of the magnetic rotor, adjusting a direction of rotation of the magnetic rotor, adjusting a vertical position of the magnetic rotor relative to the blank, adjusting a lateral position of the magnetic rotor relative to the blank, or adjusting a longitudinal position of the magnetic rotor relative to the blank.

EC 33. The method of any of the preceding or subsequent example combinations, wherein adjusting the magnetic field comprises: detecting a temperature of the blank; comparing the detected temperature to a predetermined temperature; and adjusting the magnetic rotor to adjust the heating of the blank such that the detected temperature matches the predetermined temperature.

EC 34. The method of any of the preceding or subsequent example combinations, wherein positioning the blank adjacent the magnetic rotor comprises positioning the blank a predetermined distance from the magnetic rotor.

EC 35. The method of any of the preceding or subsequent example combinations, wherein the magnetic rotor is a top magnetic rotor, wherein the heater further comprises a bottom magnetic rotor vertically offset from the top magnetic rotor, wherein passing the blank adjacent a magnetic rotor comprises passing the blank through a gap defined between the top magnetic rotor and the bottom magnetic rotor, and wherein rotating the magnetic rotor comprises rotating the top magnetic rotor and the bottom magnetic rotor to heat the blank.

EC 36. The method of any of the preceding or subsequent example combinations, wherein the heater is a first heater, and wherein the method further comprises: removing the blank from the first heater after the predetermined time period; positioning the blank in a second heater; and heating the blank with the second heater.

EC 37. The method of any of the preceding or subsequent example combinations, wherein heating the blank with the second heater further comprises controlling a temperature profile of the blank.

EC 38. The method of any of the preceding or subsequent example combinations, wherein the second heater comprises a gas-powered heater, an infrared heater, a roller furnace, an electric furnace, or an induction heater.

EC 39. The method of any of the preceding or subsequent example combinations, wherein heating the blank with the second heater comprises heating the blank to a solutionizing temperature of the blank.

EC 40. The method of any of the preceding or subsequent example combinations, wherein removing the blank from the first heater and positioning the blank in the second heater comprises moving the blank with a mover.

EC 41. The method of any of the preceding or subsequent example combinations, wherein the mover is a conveyor.

EC 42. The method of any of the preceding or subsequent example combinations, wherein the blank comprises aluminum.

EC 43. A hot forming system comprising: a heater comprising a magnetic rotor, wherein the heater is configured to: receive a blank of a metal substrate adjacent the magnetic rotor; and rotate the magnetic rotor to induce a magnetic field in the blank to heat the blank.

EC 44. The hot forming system of any of the preceding or subsequent example combinations, wherein the heater is configured to heat the blank for a predetermined time period.

EC 45. The hot forming system of any of the preceding or subsequent example combinations, wherein the predetermined time period of heating the blank is from about 30 seconds to about 20 minutes.

EC 46. The hot forming system of any of the preceding or subsequent example combinations, wherein the heater is configured to heat the blank to a predetermined temperature.

EC 47. The hot forming system of any of the preceding or subsequent example combinations, wherein the predetermined temperature is a solutionizing temperature of the blank.

EC 48. The hot forming system of any of the preceding or subsequent example combinations, further comprising a mover configured to move the blank from the heater to a hot forming press.

EC 49. The hot forming system of any of the preceding or subsequent example combinations, further comprising a hot forming press.

EC 50. The hot forming system of any of the preceding or subsequent example combinations, wherein the hot forming press comprises a water-cooled die.

EC 51. The hot forming system of any of the preceding or subsequent example combinations, wherein the heater further comprises a mover that is configured to laterally position the blank relative to the magnetic rotor.

EC 52. The hot forming system of any of the preceding or subsequent example combinations, wherein the mover comprises a conveyor.

EC 53. The hot forming system of any of the preceding or subsequent example combinations, wherein the magnetic rotor is laterally movable relative to the blank.

EC 54. The hot forming system of any of the preceding or subsequent example combinations, wherein at least one characteristic of the magnetic rotor is adjustable such that the magnetic field induced into the blank is adjustable to adjust an amount of heat induced by the magnetic rotor.

EC 55. The hot forming system of any of the preceding or subsequent example combinations, wherein the at least one characteristic comprises a rotational speed of the magnetic rotor, a direction of rotation of the magnetic rotor, a vertical position of the magnetic rotor relative to the blank, a lateral position of the magnetic rotor relative to the blank, or a longitudinal position of the magnetic rotor relative to the blank.

EC 56. The hot forming system of any of the preceding or subsequent example combinations, further comprising: a sensor configured to detect a temperature of the blank; and a controller in communication, wherein the controller is configured to adjust the magnetic rotor based on the detected temperature of the blank.

EC 57. The hot forming system of any of the preceding or subsequent example combinations, wherein the magnetic rotor is a top magnetic rotor, wherein the heater further comprises a bottom magnetic rotor vertically offset from the top magnetic rotor such that a gap is defined between the bottom magnetic rotor and the top magnetic rotor, and wherein the heater is configured to receive the blank in the gap.

EC 58. The hot forming system of any of the preceding or subsequent example combinations, wherein the heater is a first heater, and wherein the hot forming system further comprises: a second heater that is configured to: receive the blank from the first heater; and heat the blank.

EC 59. The hot forming system of any of the preceding or subsequent example combinations, wherein the second heater is further configured to control a temperature profile of the blank.

EC 60. The hot forming system of any of the preceding or subsequent example combinations, wherein the second heater comprises a gas-powered heater, an infrared heater, a roller furnace, an electric furnace, or an induction heater.

EC 61. The hot forming system of any of the preceding or subsequent example combinations, further comprising: a hot forming press; and a mover, wherein the mover is configured to move the blank from the second heater to the hot forming press, and wherein the hot forming press is configured to shape the blank.

EC 62. A method comprising: receiving a blank of a metal substrate at a heater, wherein the heater comprises a magnetic rotor; positioning the blank adjacent the magnetic rotor of the heater; and rotating the magnetic rotor to induce a magnetic field in the blank to heat the blank for a predetermined time period.

EC 63. The method of any of the preceding or subsequent example combinations, wherein rotating the magnetic to induce the magnetic field in the blank to heat the blank for the predetermined time period comprises heating the blank to a predetermined temperature, and wherein the predetermined temperature is temperature is from about 200° C. to about 600° C.

EC 64. The method of any of the preceding or subsequent example combinations, further comprising: removing the blank from the heater after the predetermined time period and moving the blank to a hot forming press; and hot forming the blank into a predetermined shape with the hot forming press.

EC 65. The method of any of the preceding or subsequent example combinations, wherein positioning the blank comprises moving the blank with a mover relative to the magnetic rotor while maintaining a lateral position of the magnetic rotor.

EC 66. The method of any of the preceding or subsequent example combinations, wherein positioning the blank comprises moving the magnetic rotor relative to the metal blank while maintaining the lateral position of the metal blank.

EC 67. The method of any of the preceding or subsequent example combinations, further comprising adjusting the magnetic field to adjust an amount of heat induced by the magnetic rotor, wherein adjusting the magnetic field comprises at least one of adjusting a rotational speed of the magnetic rotor, adjusting a direction of rotation of the magnetic rotor, adjusting a vertical position of the magnetic rotor relative to the blank, adjusting a lateral position of the magnetic rotor relative to the blank, or adjusting a longitudinal position of the magnetic rotor relative to the blank.

EC 68. The method of any of the preceding or subsequent example combinations, wherein the magnetic rotor is a top magnetic rotor, wherein the heater further comprises a bottom magnetic rotor vertically offset from the top magnetic rotor, wherein passing the blank adjacent a magnetic rotor comprises passing the blank through a gap defined between the top magnetic rotor and the bottom magnetic rotor, and wherein rotating the magnetic rotor comprises rotating the top magnetic rotor and the bottom magnetic rotor to heat the blank.

EC 69. The method of any of the preceding or subsequent example combinations, wherein the predetermined time period is from about 30 seconds to about 20 minutes.

EC 70. The method of any of the preceding or subsequent example combinations, wherein the heater is a first heater, and wherein the method further comprises: removing the blank from the first heater after the predetermined time period; positioning the blank in a second heater; and heating the blank with the second heater to a predetermined temperature.

EC 71. The method of any of the preceding or subsequent example combinations, wherein the second heater comprises a gas-powered heater, an infrared heater, a roller furnace, an electric furnace, or an induction heater.

EC 72. The method of any of the preceding or subsequent example combinations, the predetermined temperature is a solutionizing temperature of the blank, and wherein heating the blank with the second heater comprises further comprises controlling a temperature profile of the blank.

EC 73. The method of any of the preceding or subsequent example combinations, wherein the blank comprises aluminum.

EC 74. A method comprising: receiving a blank of a metal substrate at a heater, wherein the heater comprises a magnetic rotor; positioning the blank adjacent the magnetic rotor of the heater; rotating the magnetic rotor to induce a magnetic field in the blank to heat the blank; and removing the blank from the heater when the blank is at a predetermined temperature.

EC 75. The method of any of the preceding or subsequent example combinations, wherein the predetermined temperature is from about 200° C. to about 600° C.

EC 76. The method of any of the preceding or subsequent example combinations, wherein the heater is a first heater, and wherein the method further comprises: removing the blank from the first heater after the predetermined time period; positioning the blank in a second heater; heating the blank with the second heater for a second predetermined time period; removing the blank from the second heater; and hot forming the blank with a hot forming press.

EC 77. The method of any of the preceding or subsequent example combinations, wherein heating the blank with the second heater comprises heating the blank to a solutionizing temperature of the blank.

EC 78. A hot forming system comprising: a heater comprising a magnetic rotor, wherein the heater is configured to: receive a blank of a metal substrate adjacent the magnetic rotor; and rotate the magnetic rotor to induce a magnetic field in the blank to heat the blank.

EC 79. The hot forming system of any of the preceding or subsequent example combinations, wherein the heater is a first heater, and wherein the hot forming system further comprises: a second heater that is configured to: receive the blank from the first heater; and heat the blank.

EC 80. The hot forming system of any of the preceding or subsequent example combinations, wherein the second heater comprises a gas-powered heater, an infrared heater, a roller furnace, an electric furnace, or an induction heater.

EC 81. The hot forming system of any of the preceding or subsequent example combinations, further comprising: a hot forming press; and a mover, wherein the mover is configured to move the blank from the heater to the hot forming press, and wherein the hot forming press is configured to shape the blank.

The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described invention, nor the claims that follow.

That which is claimed:

1. A method comprising:
receiving a blank of a metal substrate at a heater, wherein the heater comprises a magnetic rotor, and wherein the heater is upstream from a first hot forming press of a hot forming system;
positioning the blank adjacent the magnetic rotor of the heater and in a non-contacting configuration with the magnetic rotor;
rotating the magnetic rotor to induce a magnetic field in the blank to heat the blank for a predetermined time period;
removing the blank from the heater after the predetermined time period and moving the blank to the first hot forming press; and
shaping the blank into a predetermined shape with the first hot forming press.

2. The method of claim 1, wherein rotating the magnetic rotor to induce the magnetic field in the blank to heat the blank for the predetermined time period comprises heating the blank to a predetermined temperature, and wherein the predetermined temperature is from about 200° C. to about 600° C.

3. The method of claim 1, wherein positioning the blank comprises moving the blank with a mover relative to the magnetic rotor while maintaining a lateral position of the magnetic rotor.

4. The method of claim 1, wherein positioning the blank comprises moving the magnetic rotor relative to the blank while maintaining a lateral position of the blank.

5. The method of claim 1, further comprising adjusting the magnetic field to adjust an amount of heat induced by the magnetic rotor, wherein adjusting the magnetic field comprises at least one of adjusting a rotational speed of the magnetic rotor, adjusting a direction of rotation of the magnetic rotor, adjusting a vertical position of the magnetic rotor relative to the blank, adjusting a lateral position of the magnetic rotor relative to the blank, or adjusting a longitudinal position of the magnetic rotor relative to the blank.

6. The method of claim 1, wherein the magnetic rotor is a top magnetic rotor, wherein the heater further comprises a bottom magnetic rotor vertically offset from the top magnetic rotor, wherein passing the blank adjacent a magnetic rotor comprises passing the blank through a gap defined between the top magnetic rotor and the bottom magnetic rotor, and wherein rotating the magnetic rotor comprises rotating the top magnetic rotor and the bottom magnetic rotor to heat the blank.

7. The method of claim 1, wherein the predetermined time period is from about 30 seconds to about 20 minutes.

8. The method of claim 1, wherein the heater is a first heater, and wherein the method further comprises:
removing the blank from the first heater after the predetermined time period;
positioning the blank in a second heater upstream from the first hot forming press; and
heating the blank with the second heater to a predetermined temperature.

9. The method of claim 8, wherein the second heater comprises a gas-powered heater, an infrared heater, a roller furnace, an electric furnace, or an induction heater.

10. The method of claim 8, wherein the predetermined temperature is a solutionizing temperature of the blank, and wherein heating the blank with the second heater comprises further comprises controlling a temperature profile of the blank.

11. The method of claim 1, wherein the blank comprises aluminum or an aluminum alloy.

12. The method of claim 1, wherein an axis of rotation of the magnetic rotor is parallel to a direction of travel of the blank through the heater.

13. A method comprising:
receiving a blank of a metal substrate at a first heater, wherein the first heater comprises a magnetic rotor;
positioning the blank adjacent the magnetic rotor of the first heater;
rotating the magnetic rotor to induce a magnetic field in the blank to heat the blank;
removing the blank from the first heater when the blank is at a predetermined temperature and after a first predetermined time period;
positioning the blank in a second heater;
heating the blank with the second heater for a second predetermined time period;
removing the blank from the second heater; and
hot forming the blank with a hot forming press.

14. The method of claim 13, wherein the predetermined temperature is from about 200° C. to about 600° C.

15. The method of claim 13, wherein heating the blank with the second heater comprises heating the blank to a solutionizing temperature of the blank.

16. A hot forming system comprising:
a heater comprising a magnetic rotor; and
a first hot forming press of the hot forming system,
wherein the heater is upstream from the first hot forming press and is configured to:
receive a blank of a metal substrate adjacent the magnetic rotor and in a non-contacting configuration with the magnetic rotor; and
rotate the magnetic rotor to induce a magnetic field in the blank to heat the blank,
wherein the hot forming press is configured to receive the blank from the heater after a predetermined time period and shape the blank into a predetermined shape.

17. The hot forming system of claim 16, wherein the heater is a first heater, and wherein the hot forming system further comprises:
a second heater upstream from the first hot forming press and that is configured to:
receive the blank from the first heater; and
heat the blank.

18. The hot forming system of claim 17, wherein the second heater comprises a gas-powered heater, an infrared heater, a roller furnace, an electric furnace, or an induction heater.

19. The hot forming system of claim 16, further comprising:
a mover,
wherein the mover is configured to move the blank from the heater to the first hot forming press.

20. The hot forming system of claim 16, wherein an axis of rotation of the magnetic rotor is parallel to a direction of travel of the blank through the heater.

* * * * *